(12) United States Patent
Heer et al.

(10) Patent No.: US 11,296,835 B2
(45) Date of Patent: Apr. 5, 2022

(54) METHOD OF OPERATING A REDUNDANT PRP

(71) Applicant: Hirschmann Automation and Control GmbH, Neckartenzlingen (DE)

(72) Inventors: Tobias Heer, Frickenhausen (DE); Valentin Klimmek, Muensingen (DE)

(73) Assignee: HIRSCHMANN AUTOMATION AND CONTROL GMBH, Neckartenzlingenh (DE)

( * ) Notice: Subject to any disclaimer, the term of this patent is extended or adjusted under 35 U.S.C. 154(b) by 0 days.

(21) Appl. No.: 15/571,282

(22) PCT Filed: Jun. 3, 2016

(86) PCT No.: PCT/EP2016/062672
§ 371 (c)(1),
(2) Date: Nov. 26, 2017

(87) PCT Pub. No.: WO2016/193443
PCT Pub. Date: Dec. 8, 2016

(65) Prior Publication Data
US 2018/0115396 A1 Apr. 26, 2018

(30) Foreign Application Priority Data
Jun. 3, 2015 (DE) .......................... 102015210307.2

(51) Int. Cl.
*H04L 1/22* (2006.01)
*H04L 1/18* (2006.01)
(Continued)

(52) U.S. Cl.
CPC .................. *H04L 1/22* (2013.01); *H04L 1/08* (2013.01); *H04L 1/1835* (2013.01);
(Continued)

(58) Field of Classification Search
CPC ......... H04L 1/22; H04L 49/9057; H04L 1/08; H04L 1/1835; H04L 12/40176;
(Continued)

(56) References Cited

U.S. PATENT DOCUMENTS 8,582,424 B2 * 11/2013 Kirrmann ............. H04L 12/437
370/222
8,667,374 B2 * 3/2014 Watford .................... H04L 1/08
714/776

(Continued)

OTHER PUBLICATIONS

A. Iselt, "A new synchronization algorithm for hitless protection switching in ATM networks," 1999 IEEE International Performance, Computing and Communications Conference (Cat. No. 99CH36305), 1999, pp. 370-376, doi: 10.1109/PCCC.1999.749461. (Year: 1999).*

*Primary Examiner* — Thinh D Tran
(74) *Attorney, Agent, or Firm* — Andrew Wilford

(57) ABSTRACT

The invention relates to a method for operating a transmission system (1) that comprises a first network (2) and at least one additional network (3), in which data are exchanged between said at least two networks (2, 3) by means of data of the first network (2) being fed to duplication means (4) in the form of data packets, these fed data packets being wirelessly transmitted to separator means (5) via at least two transmission paths (6, 7) using PRP, and being forwarded from said separator means (5) to the connected additional network (3) in the form of a data stream. The invention is characterized in that the data packets are temporarily stored in a memory once they have been transmitted via the at least two transmission paths (6, 7).

5 Claims, 1 Drawing Sheet

(51) Int. Cl.
*H04L 1/08* (2006.01)
*H04L 12/40* (2006.01)
*H04L 49/9057* (2022.01)
*H04L 1/06* (2006.01)
*H04L 1/04* (2006.01)
*H04L 1/00* (2006.01)
*H04L 69/324* (2022.01)

(52) U.S. Cl.
CPC .... *H04L 12/40176* (2013.01); *H04L 49/9057* (2013.01); *H04L 1/04* (2013.01); *H04L 1/06* (2013.01); *H04L 69/324* (2013.01); *H04L 2001/0096* (2013.01)

(58) Field of Classification Search
CPC . H04L 69/324; H04L 2001/0096; H04L 1/04; H04L 1/06
See application file for complete search history.

(56) References Cited

U.S. PATENT DOCUMENTS

| | | | |
|---|---|---|---|
| 9,137,168 B2* | 9/2015 | Brennum | H04N 21/4381 |
| 9,407,582 B2 | 8/2016 | Angst | |
| 9,887,874 B2* | 2/2018 | Vasseur | H04L 41/0668 |
| 2013/0223204 A1* | 8/2013 | Angst | H04L 41/0668 370/218 |
| 2014/0086136 A1* | 3/2014 | Angst | H04L 45/24 370/412 |
| 2015/0049639 A1* | 2/2015 | Angst | H04L 12/4641 370/254 |
| 2015/0295635 A1* | 10/2015 | Koskiahde | H04L 12/2863 370/315 |
| 2015/0365319 A1* | 12/2015 | Finn | H04L 45/24 370/221 |
| 2016/0070669 A1* | 3/2016 | Edmiston | G06F 13/382 710/113 |

* cited by examiner

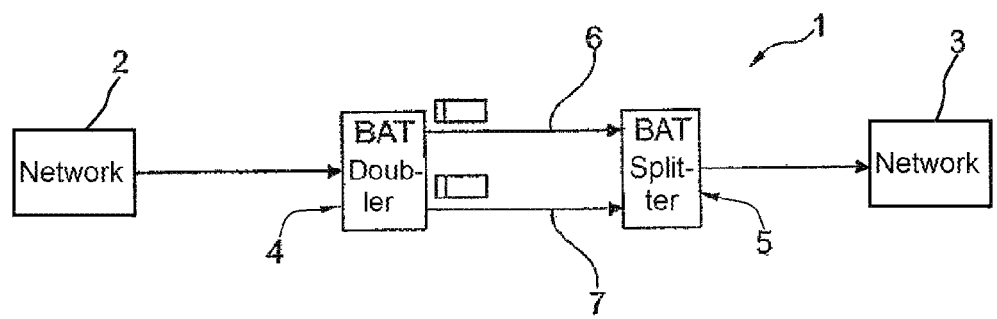
Fig.1
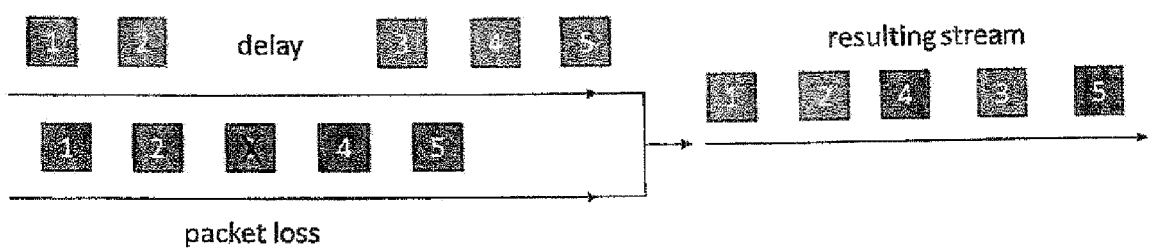
Fig. 2 - Prior Art

METHOD OF OPERATING A REDUNDANT PRP

CROSS REFERENCE TO RELATED APPLICATIONS

This application is the US-national stage of PCT application PCT/EP2016/062672 filed 3 Jun. 2016 and claiming the priority of German patent application 102015210307.2 itself filed 3 Jun. 2015.

FIELD OF THE INVENTION

The invention relates to a method of operating a transmission system having a first network and at least one other network, with data being exchanged between at least two of the networks in that data is fed from the first network to a doubler and then transmitted wirelessly by PRP via at least two transmission paths to a splitter that forwards the data to the connected second network.

BACKGROUND OF THE INVENTION

Such known transmission systems are used in safety-critical cases in process engineering systems, stationary or mobile work equipment, for example in work vehicles such as cranes, or the like.

It is critical here that data be transmitted reliably from the first network to the at least one other network. Such safety-critical data transmission is important especially if the data are transmitted via a wireless transmission path. One improvement has already been made to the effect that not only one transmission path, but at least two, preferably exactly two transmission paths, are used for this safety application. Another improvement of this redundant data transmission has been made to the effect that it is performed wirelessly, that is, via radio or light, by PRP (Parallel Redundancy Protocol) that is a layer-2 redundancy process that is dependent on higher layers and is suitable above all for real-time Ethernet mechanisms.

It is true that such a transmission system works satisfactorily in safety-related aspects, because there is redundancy for both transmission paths. For example, if a wireless transmission path is disrupted or malfunctions, the at least second transmission path can be used in order to ensure the data transmission from the first to the other network.

At the same time, however, it cannot be ruled out that, despite this redundancy, the data transmission between the two networks will be impermissibly disrupted in safety-critical aspects.

OBJECT OF THE INVENTION

It is therefore the object of the invention to substantially improve a method of operating a transmission system in safety-critical aspects.

SUMMARY OF THE INVENTION

According to the invention, the data packets are buffered in a memory after they are transmitted via the at least two transmission paths.

The data stream that is to be transmitted from the first network to the at least one other network is first split in an inherently known manner and transmitted wirelessly via the two similar or different transmission paths (different due to time-shifted transmission, for example). The two sets of data (data streams in the form of data packets) that were transmitted separately from one another are then merged again via the splitter and fed into the at least one other network as an ideally original data stream. Since it is possible for data packets (i.e. at least one data packet, or optionally a plurality of data packets as well) to arrive with defects or not at all at the splitter during transmission as a result of an incident on at least one transmission path, the data packets that are transferred via the transmission paths and reach the splitter are buffered. Advantageously, this makes it possible, for example, to use a data packet (or a plurality of data packets) that were transmitted without defects via one transmission path to be used from its buffer in order to replace the corresponding data packet (or the corresponding data packets) that were not transmitted at all or were transmitted with defects and therefore did not reach the splitter or did so with defects with the buffered, defect-free data packets. In that case, it is assumed that a data packet has been transmitted without defects via a transmission path and buffered, for example, and a corresponding data packet has been transmitted via the other transmission path in the incorrect sequence or not at all or with defects.

The defectively transmitted data packet of one transmission path can thus advantageously replace the data packet in the data stream of the other transmission path that is defective or was not transmitted at all by being taken from the buffer, or the data packet of this transmission path that was transmitted in the incorrect sequence can be inserted in the correct sequence (that is, in the proper position) into the data stream to be forwarded to the other network.

All in all, the method according to the invention thus offers the crucial advantage that the original data stream that was split by the doubler and sent over two transmission paths can be forwarded again by the splitter as a correct data stream to the other network by virtue of the fact that the two transmitted data streams are checked and then, if it is determined that one data stream over one or the other transmission path or even the data streams over both transmission paths do not match with the original data stream, a correction can be performed of the transmitted data streams from the buffered data packets. It is thus especially advantageous that, if data packets in one transmitted data stream have not been transferred in the correct sequence or data packets were not transferred at all, these data packets that were transmitted via the other transmission path are buffered in the memory and taken from it in order to correct the data stream to be forwarded to the other network. This is done particularly such that a buffered data packet of one data stream is inserted into the data stream to be transmitted via the other transmission path so as to replace a missing data packet (in the event of a gap) or a data packet that is not in the correct sequence (in the event the data packets were transmitted in an incorrect sequence). In a first additional advantageous embodiment of the invention, if at least one data packet has been lost on one transmission path, at least one corresponding data packet that was transmitted without defects on the at least one other transmission path and buffered replaces this at least one lost data packet in the data stream to be forwarded. This offers the advantage that it is assumed that a data packet that is lost on one transmission path can be replaced by a corresponding data packet that was transmitted without defects via the other transmission path through removal from the buffer and insertion into the data stream to be forwarded. As a result, the original data stream that is to be transmitted via both transmission paths is fault-free after the insertion of the buffered data packet into the data stream to be forwarded and corresponds to the original data stream.

In another embodiment of the invention, if at least one data packet on one transmission path did not arrive in the correct sequence, this at least one data packet that was transmitted in the incorrect sequence is deleted (before the forwarding of the data stream to the other network) and replaced in the data stream to be forwarded at the correct position by at least one corresponding data packet that was transmitted on the at least one other transmission path and buffered. In that case, it is assumed that, due to some sort of disturbance, data packets of the data stream are not transmitted in the correct sequence during the transmission of the data stream via the first transmission path, for example, and thus arrive out of sequence at the splitter. This is disadvantageous particularly if a data packet is transmitted not only in the incorrect sequence but also with substantial delay, so that it is no longer available in due time for forwarding to the other network. At the same time, however, it must be assumed that this data packet that was transmitted with substantial delay on the first transmission path was transmitted on time via the other transmission path in a sufficient time window, so that it is not only buffered (during the sufficient time), but rather can also be taken during a likewise sufficient time from the buffer memory and inserted into the data stream that was transmitted via the first transmission path in the correct sequence, that is, at the correct position. While it is true that this will also generally occur with a certain time delay, not only can this time delay be tolerated, it is also substantially shorter than if, as a result of the time delay during transmission of the data stream via the first transmission path and the substantially belated arrival of a data packet, this data stream had to be resorted.

According to a development of the invention that, if at least one data packet did not arrive in the correct sequence on a transmission path, it is replaced in the data stream to be forwarded in the proper place in a time-shifted manner after buffering. This, too, offers the advantage that it is first waited until all of the data packets of a data stream have been transmitted via one transmission path, upon which an analysis is performed in order to determine whether they arrived in the correct sequence. During this transmission time, the data packets arriving at the splitter are buffered, so that an analysis of the sequence of the received data packets can be performed subsequently. If it turns out that at least one data packet did not arrive in the correct sequence, it can be removed from the buffer memory and inserted in a time-shifted manner in the data stream to be forwarded such that it is located at the correct position after insertion in order to ensure that the original data stream, which consists of a sequence of successive data packets in a target sequence, is transmitted and forwarded to the other network in a fault-free manner.

According to the invention, the buffering is performed according to a predetermined criterion, particularly for a predetermined period of time. This is advantageous in terms of reducing storage size and increasing the speed of the data transmission. It is assumed in this regard that the data streams to be transmitted (that is, the sequence of successive data packets) is always stored only as long as is required in order to make the buffered data packets available in order to correct the data stream being forwarded, that is, to replace faulty data packets from the buffered data packets or to correct the sequence of the data stream being forwarded. Another criterion could be the number of data packets, the sum of the size of the buffered data packets, and the like.

According to the invention, one related aspect is that, once the predefined criterion is reached, preferably the period of time, the data packets that were buffered during this period of time or generally according to the predefined criterion are deleted. As a result, free storage space is available again upon conclusion of the correction in order to temporarily store a new portion of a data stream in the memory. This increases not only the processing speed of the memory but also effectively prevents buffered data packets of a transmitted data stream from being confused with data packets of the following portion of the data stream in the memory. This advantageously increases not only the redundancy of the data transmission but also correct and reliable data transmission, because the data packets of a portion of a data stream cannot mix together with data packets of another portion of the data stream.

According to the invention, the buffering is performed in a suitable buffer, preferably in the form of a circular buffer. With circular buffering, an especially advantageous implementation of the buffering is made available, since this automatically ensures that the buffered data packets of one portion of the data stream are deleted when new data packets of another portion of the data stream follow. Other buffers can however also be used just as well.

If, due to some kind of disruption during the transmission of the data packets via the at least two transmission paths, a correction of data packets that arrived faulty or in the incorrect sequence cannot be made, particularly not within the predefined time period, the data stream is forwarded from the splitter in any case, particularly after the predefined time period has lapsed. An interruption of the forwarding of the data stream to the other network is thus effectively prevented in the event the method according to the invention cannot be carried out or not within the predetermined time period. Such a case arises, for example, if a data packet that is to be transmitted via both transmission paths is transmitted with defects or not at all on both transmission paths due to a disruption. Nor is it available during buffering in such a case, or only in defective form, and it must be tolerated that the data stream to be forwarded to the other network does not contain this at least one data packet or is defective in such a case.

In order to compensate for packet mix-ups occurring as a result of PRP during use on a radio path, the received packets are buffered for a certain time or for a certain volume in case the packet sequence of one of the two data streams is not complete. The buffering is continued until the next missing packet of the faster path reaches the slower path. This mechanism is continued for all subsequent packets.

In order to avoid substantially delayed delivery in the event of a lost packet on both paths, a data-flow time window can be configured and then a buffered packet stream is delivered even if packets are missing. Time-critical applications can thus also be operated with the reordering buffer.

BRIEF DESCRIPTION OF THE DRAWING

The proposed method can be carried out on a transmission system that is illustrated in the attached drawing in which;

FIG. 1 is a simplified schematic view of this invention; and

FIG. 2 is a schematic diagram illustrating the prior art.

SPECIFIC DESCRIPTION OF THE INVENTION

FIG. 1 shows a basic layout of a transmission system having two networks 2 and 3 that exchange data between each other. This data exchange can take place either unidirectionally from the network 2 to the network 3 (or vice versa) or also bidirectionally between the two networks 2 and 3.

The networks 2 and 3 can be simple or complex networks, for example with a ring or linear topology or the like. It is also conceivable, however, for such a network 2 and 3 to comprise only one single element such as a sensor, an actuator, a control device, or the like.

In order to transmit the data from the network 2 to the network 3, for example, a doubler 4 is provided. This doubler 4 splits the data stream that is fed in into two data streams. After they are received, the two data streams are likewise merged by a splitter 5, with the received data streams being forwarded to the network 3 after having been merged.

The transmission of the data between the doubler 4 and the splitter 5 takes place wirelessly by PRP via two similar or different transmission paths 6 and 7. The wireless transmission advantageously occurs via radio, although optical transmission is also conceivable. It is also conceivable for one transmission path 6 to be a r-f path and for the second transmission path 7 to be an optical data transmission path. If both transmission paths 6 and 7 are radio transmission paths, for example, the data, more precisely the data packets, can be transmitted over these two radio transmission paths at the same frequency or at different frequencies, for example, and otherwise with the same parameters or with different transmission parameters. Similar transmission paths 6 and 7 are to be preferred in terms of their construction, although transmission paths 6 and 7 that differ from one another (for example optical/radio or with different transmission parameters) are to be preferred in terms of the increased redundancy that provides.

After the data have been fed from the first network 2 to the doubler (in PRP, also referred to as a redundancy box), each data packet is caused to be transmitted multiple times via the same transmission path 6 and 7 and/or an error correction value is assigned to each data packet. The transmission of the data packets via the transmission paths 6 and 7 then takes place analogously, with these being appropriately evaluated, optionally processed, by the splitter 5 (in PRP, also referred to as a redundancy box) and fed to the other network 3 as data packets.

The foregoing description of FIG. 1 relates to a unidirectional data transmission from the first network 2 to the additional, particularly the second network 3. For this purpose, the doubler 4 is designed to split the data stream, whereas the splitter 5 is designed to merge the received data stream.

If data transmission from the network 3 to the network 2 is also desired, additional doubler 4 and splitter 5 can be present in the transmission path between the network 3 and the network 2, thus resulting in a double construction. Alternatively, the splitting/doubling devices 4 and 5 can also be designed to not only double the supplied data stream, but also to separate the data streams fed in via the transmission paths 6 and 7, which also applied to the splitter 5.

FIG. 2 shows the known, disadvantageous method of the sake of example in a case in which at least one data packet (here, the data packets three, four, and five) have been transmitted with delay on one transmission path 6 (top left in FIG. 2, data stream consisting of five data packets).

On the other transmission path 7 (bottom left in FIG. 2, the data stream consisting of five data packets), one data packet (data packet three) has been lost during transmission.

If these two (faulty) data streams are put back together by the splitter 5, this results in the faulty data stream shown in FIG. 2, with the data packets in the incorrect sequence one, two, four, three, five.

This faulty data stream does not occur when the method according to the invention is used; rather, by virtue of the buffering and removal of the stored data packets from the buffer memory, the data packets are advantageously put into the correct sequence.

The invention claimed is:

1. A method of operating a transmission system having a first network and one other network with exchange of the data packets between the networks, the method including the steps of:
  feeding the data packets from the first network to a doubler;
  splitting the data packets with the doubler into two separate data streams of the data packets;
  transmitting each of the two data streams separately from each other wirelessly by PRP via two respective wireless transmission paths to the second network;
  receiving and buffering the two separate data streams in a memory at the second network; and
  if one data packet on one transmission path did not arrive in correct sequence,
  buffering the two separate data streams in the memory at the second network and delaying transmission to the second network,
  deleting the one data packet that was transmitted in the incorrect sequence and replacing the one data packet that deleted in the data stream to be forwarded at a correct position by the corresponding data packet that was transmitted on the other transmission path and buffered,
  ending the buffering, and
  transmitting the corrected sequence after a timeout or after the sequence of the data stream is corrected.

2. The method defined in claim 1, wherein the buffering is performed according to a predetermined criterion.

3. The method defined in claim 2, further comprising the step, once the predefined criterion is reached, of deleting the buffered data packets.

4. The method defined in claim 2 further comprising the step, once the predetermined criterion is reached, of: forwarding the buffered data packets.

5. The method defined in claim 2, wherein the predetermined criterion is a period of time.

* * * * *